United States Patent [19]

Coulomb

[11] 4,198,654
[45] Apr. 15, 1980

[54] SYSTEMS FOR THE DISPLAY AND INDICATION OF INFORMATION

[75] Inventor: Pierre Coulomb, Fontenay sous/Bois, France

[73] Assignee: Societe Francaise d'Equipements pour la Navigation Aerienne, Velizy-Villacoublay, France

[21] Appl. No.: 855,315

[22] Filed: Nov. 28, 1977

Related U.S. Application Data

[63] Continuation-in-part of Ser. No. 706,016, Jul. 16, 1976.

[30] Foreign Application Priority Data

Nov. 29, 1976 [FR] France .................................. 76 35971
Apr. 1, 1977 [FR] France .................................. 77 09997

[51] Int. Cl.² ................................................ H04N 7/18
[52] U.S. Cl. .................................... 358/109; 358/240; 358/241; 358/901; 35/12 B; 35/12 N; 343/6 TV

[58] Field of Search ............... 358/103, 108, 109, 200, 358/240, 241, 901; 343/6 TV; 350/174; 35/12 R, 12 B, 12 W, 12 M, 12 F, 10.2

[56] References Cited

U.S. PATENT DOCUMENTS

| | | | |
|---|---|---|---|
| 3,446,916 | 5/1969 | Abel et al. | 358/901 |
| 3,824,535 | 7/1974 | Rover, Jr. | 358/250 |
| 3,915,548 | 10/1975 | Opittek et al. | 358/250 |

Primary Examiner—Robert L. Griffin
Assistant Examiner—Edward L. Coles
Attorney, Agent, or Firm—Scully, Scott, Murphy & Presser

[57] ABSTRACT

A system for the display and indication of information on the windshield of an airplane to the aircraft's pilot. The information to be displayed is converted into optical images which are transferred by a plurality of bundles of optical fibers to a projection system positioned beneath the windshield. The projection system projects the images onto the windshield such that they are reflected therefrom in the axis of the pilot's field of vision.

6 Claims, 12 Drawing Figures

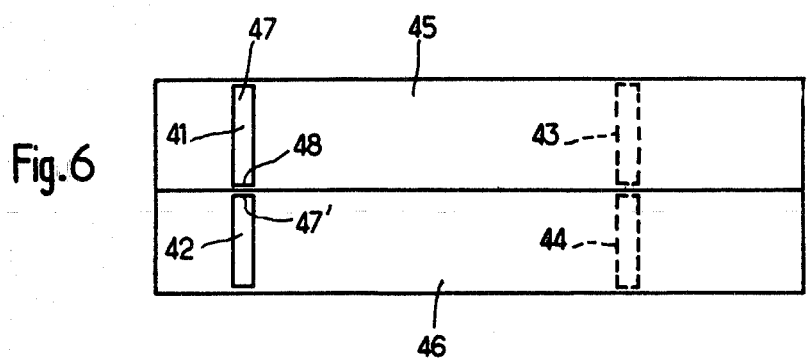
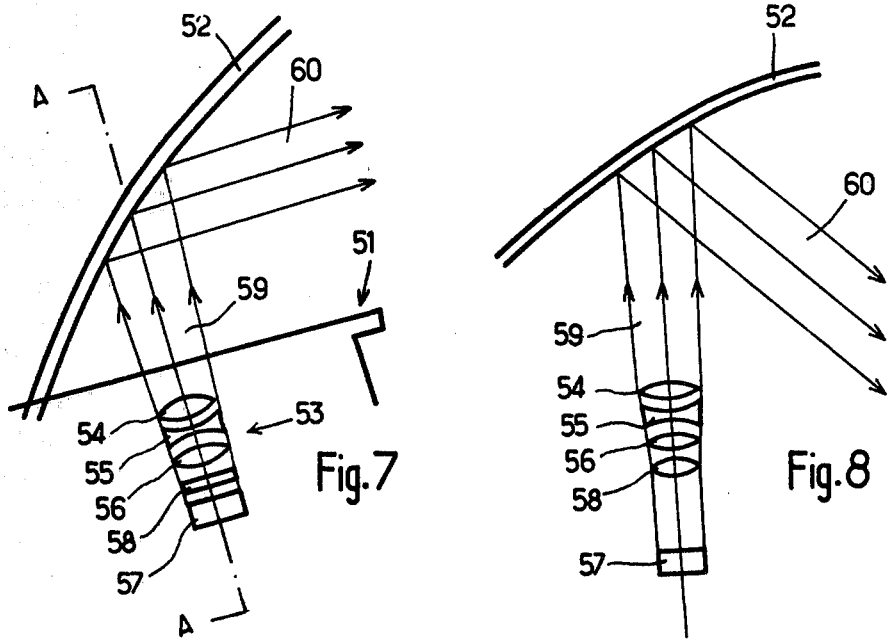

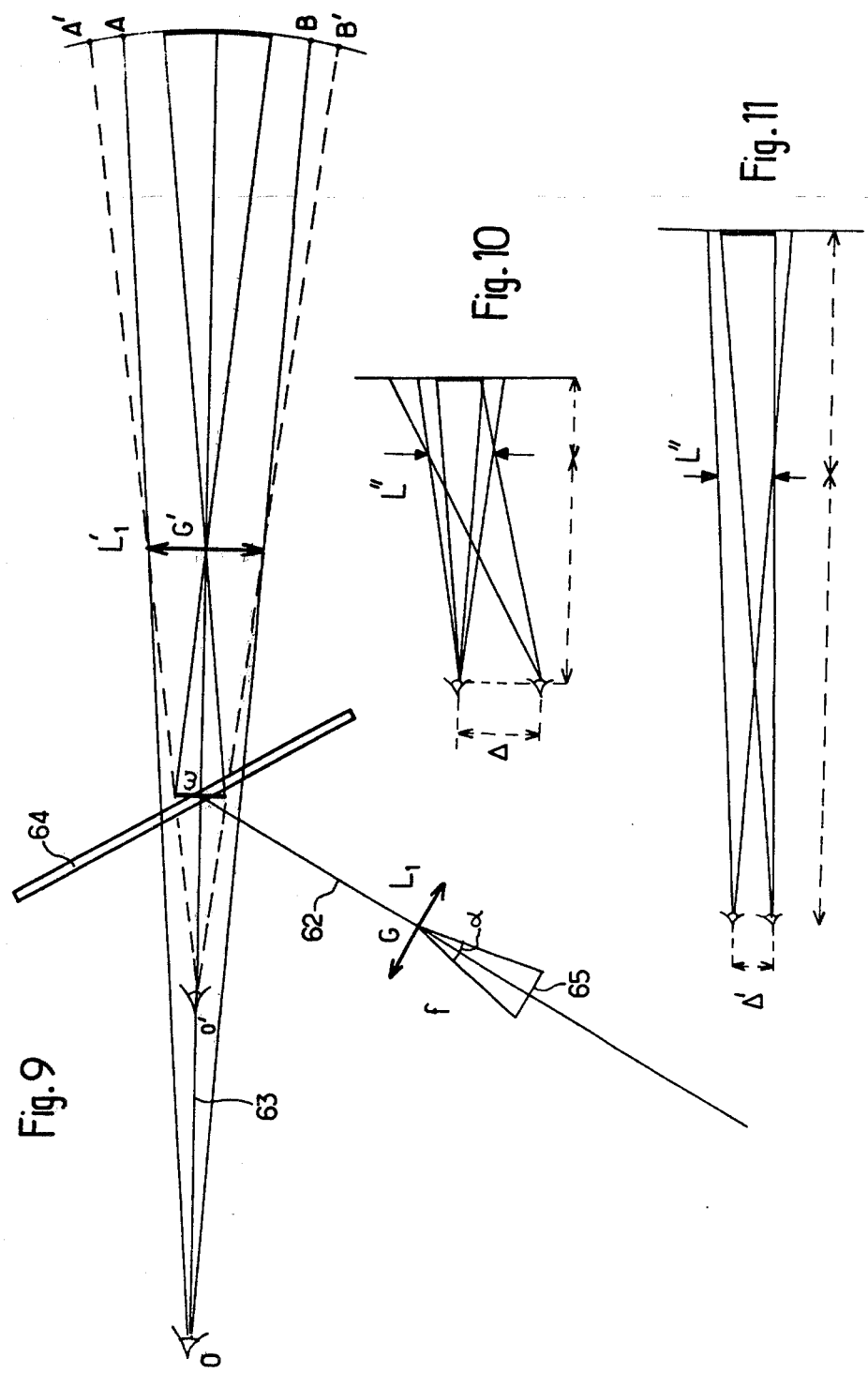

SYSTEMS FOR THE DISPLAY AND INDICATION OF INFORMATION

CROSS REFERENCE TO RELATED APPLICATION

This patent application is a continuation-in-part of application Ser. No. 706,016, filed July 16, 1976, for IMPROVEMENTS IN SYSTEMS FOR THE DISPLAY AND INDICATION OF INFORMATION.

BACKGROUND OF THE INVENTION

1. Field of the Invention

The present invention relates to improvements in display and indication systems of the type described in the above-referenced parent patent application. Display and indication systems of this nature provide the pilot of an aircraft with pertinent information concerning the control or navigation of the plane without the pilot having to interrupt his external visual observations through the plane windshield. In a typical situation involving an aircraft, this information can advantageously be composed of the usual instructions for a flight director or of an indicator for guiding the airplane on the runway or in flight.

Generally, display and indication systems of this type comprise essentially at least: a converter capable of transforming information, either in analog or numeric form, which is to be provided to the pilot into corresponding optical signals; a transfer means for permitting these optical signals to be channeled and transmitted in the form of an image; a projection or lens system which permits the images thus obtained to be projected onto the windshield of the vehicle, preferably in the axis of the pilot's field of vision.

SUMMARY OF THE INVENTION

More particularly, the present invention has for its object a combination of improvements designed to augment the performance of display and visual systems of the type described herein.

A first improvement, according to the invention, concerns the forming and transferring of the images, and has for its object obtaining a better and sharper image and also of possibly forming at least two juxtaposed or interpenetrated (superimposed) images.

In order to attain this result, the invention proposes the following features where the transfer of optical signals is through the intermediary of optical fibers:

1. At the reception and emission ends of the fibers they are arranged strictly parallel to each other such that light rays incident on the reception ends are strictly perpendicular to the outer ends of each of the fibers, and that the light rays emitted at the emission ends of the fibers also are strictly parallel.

2. The arrangement of the emission ends of the bundles of optical fibers is presented in a geometric pattern permitting juxtaposition, especially where it is desired to generate index symbols which can change place along a scale.

3. The divisions of the aforementioned arrangements in the object focal plane are such that one can have interpenetration in the same zone of several groups of bundles affected by different information.

Another improvement, according to the present invention, lies in resolving the problems relating to the mixing of different information projected onto the same portion of the windshield by the same lens system.

In order to overcome these problems, the present invention proposes essentially three solutions.

A first solution uses several image forming means connected to an optical mixer comprising as many channels as there are image forming means.

In a second solution, instead of using one mixer with many channels in series, many mixers are used having a limited number of channels, for example, a series of several mixers with two channels formed by semireflecting or dichromatic mirrors.

A third solution is a mixed arrangement which comprises several distinct image forming means connected to one or several optical mixers, with the image forming means comprising arrangements permitting an interpenetration of objects representative of different information.

Another improvement according to the invention is in regard to the control system of the image forming means, and in particular has reference to the problem of information generated by computers in the form of numerical electric signals which are to be transformed into light signals.

The invention has a simple solution for this problem, and utilizes the well known properties of the eyes' retinal persistence and of the residual and inertia properties of light sources.

Thus, instead of simultaneously forming a plurality of objects in the focal plane of the lens, these objects are generated successively at such a frequency, that the successive interruptions are not perceptible to the human eye, which sees the images on the windshield in an apparent continuous and simultaneous manner.

Another problem which the present invention addresses is that of the image size. Because the projected beams emitted by the lens or at least those reflected by the windshield are collimated, it is necessary if one wishes to obtain an image of a desired size to utilize a lens size which corresponds to the size of the image. Consequently, when a larger image is desired it is necessary to provide a larger optical system.

Moreover, these optical systems are mounted in a housing behind the instrument panel. Consequently, because space is restricted, it is not possible to provide large optical systems, and the size of the images is restricted.

Accordingly, the present invention has as an object that of eliminating this restriction on size, and proposes enlarging the dimension of the image projected on the windshield without the optical system being enlarged in proportion. In accordance with this aspect of the invention, two parallel mirrors, one of which is partially reflective, are placed in the path of the projected beam in such a way that the beam is partly reflected by the partially reflecting mirror towards the windshield to form a first image, and partially transmitted by the semi-reflecting mirror to a second mirror. The second mirror reflects this transmitted portion to form a second image identical to the first image. The positions of the mirrors are such that the images are juxtaposed either vertically or horizontally with respect to each other. Of course, in order to obtain a good juxtaposition, it is necessary to choose wisely the form or pattern of the images.

In the display and indication systems of the type previously described, an indespensable condition for a good view of information projected on the windshield is that the rays of the light beams reflected from the windshield be collimated. Where the windshield is flat, it is sufficient to use an optical system or lens which collimates the projected beam. However, an optical system of this type is not satisfactory for a curved windshield since the collimated rays projected by the optical system will converge after reflection from the windshield, which results in poor visibility of the image projected onto the windshield.

The present invention proposes to overcome this problem by providing, in the optical system previously described, correcting optics which compensates at least partially for the divergence of the beam reflected from the windshield. According to one aspect of the present invention, the correcting optics includes a small lens, the shape of which are selected to cause the beam emitted by the projection lens, to diverge an amount equal to the angular convergence of the reflected beam, which results in a collimated beam reflected from the windshield of the airplane.

However, it is advisable to note that because the windshield often assumes a complex shape other than the common form of a conical section with an elliptical base, and also that the projection is from a symmetrical axis or a center of symmetry, it is practically impossible to obtain a lens or lens system permitting compensation for all the angular disturbances in all the directions caused by the windshield.

To simplify the attainment of a lens or lens system, the invention proposes to correct the projected beam only in one critical plane. Thus, according to a preferred embodiment of the invention, the lens is a cylindrical lens, and consequently the correction is principally in the parallel planes, perpendicular to the axis of generation of the lens.

Another improvement, according to the invention, concerns the projection system, this improvement being particularly to enlarge the system's field of projection in such a manner that the pilot can see the totality of the projected images, even if he is seated laterally with regard to the system.

The dimensions of the optical system's field are a function of the distance between the eye and the plane of the diaphragm of the lens (this plane can be one of the lens or that of an element of the lens system having a function similar to that of a diaphragm). To arrive at this the invention proposes to shorten as much as possible the optical path between the objective and the projection zone on the windshield while placing the exiting lens at the level of the opening in the upper surface of the instrument panel, this surface also being the lower limit of the normal field of vision of the pilot below.

Several embodiments of the invention will now be described as non-limiting examples with reference to the attached drawings in which:

FIG. 6 is a schematic representation of the final image obtained by juxtaposing two images derived from the same bundle of optic fibers;

FIG. 7 is a partial longitudinal schematic section of the front of the cabin of an aircraft equipped with a display and indication system designed for a curved windshield;

FIG. 8 is a schematic diagram taken along line A—A in FIG. 7, and illustrates the nature of the correction obtained by a cylindrical lens in a plane perpendicular to the axis of generation of the lens;

FIG. 9 is a simplified theoretical optical diagram showing the optical paths of the light rays refracted by the lens;

FIGS. 10 and 11 are optical theoretical diagrams illustrating the problems which the present invention seeks to resolve; and FIG. 12 is a partial schematic section of an aircraft cabin schematically showing the preferred position of the exiting lens of the optical system in the upper part of the shroud of the instrument panel.

Figure 1:
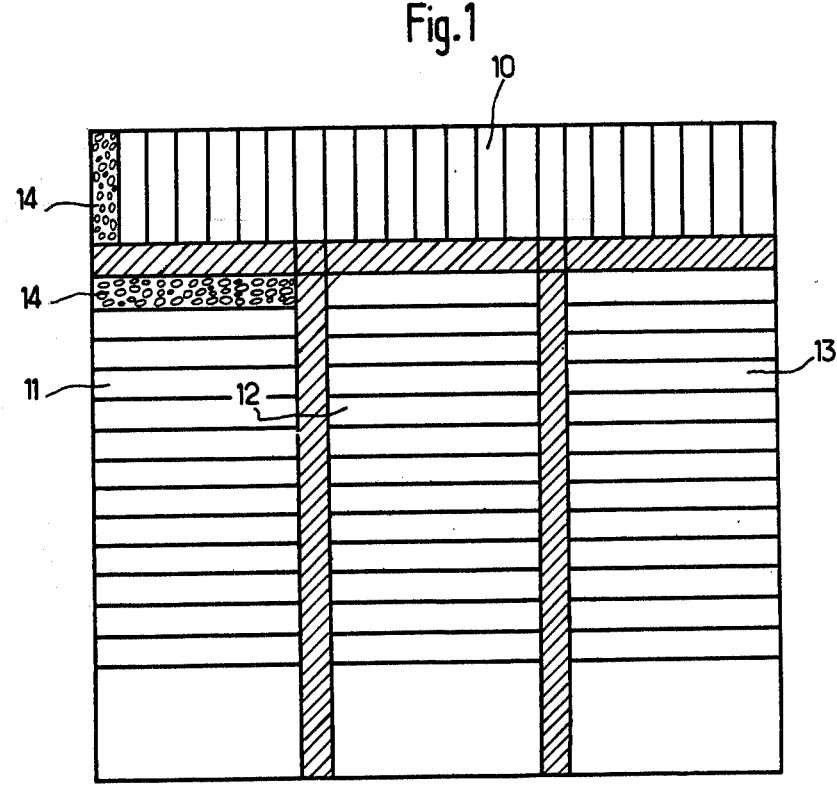
FIG. 1 illustrates the pattern or arrangement of optic fibers at the image forming means in the focal plane of the objective.
Figure 2:
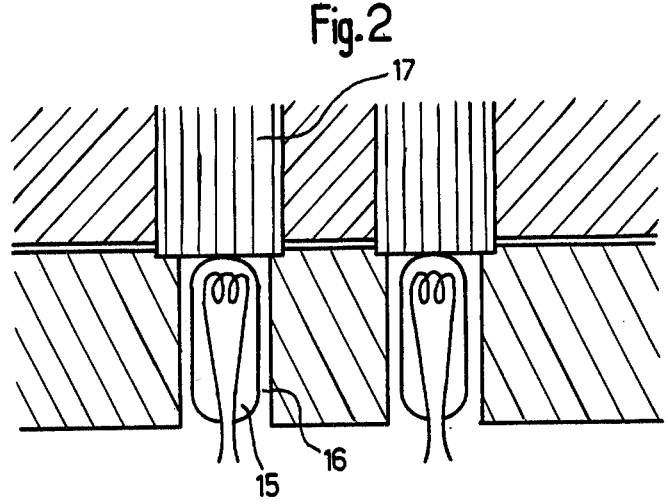
FIG. 2 is a schematic representation of the illumination system for the receiving ends of the optic fibers.

In the embodiment shown in FIGS. 1 and 2, the transfer means enables the channeling of light bundles to transmit an image to an image forming means. The transfer means includes bundles of optical fibers each of which is divided into a plurality of subsystems, with each subsystem having a plurality of optic fibers. The receiving ends of the optic fibers are placed by a controlled light source, and the transmitting ends of the fibers are positioned in the focal plane of a lens system and arranged in a pattern to correspond to the image that is to be shown to the pilot.

In order to be able to superimpose the receiving ends of different subsystems of the bundle of optic fibers without resulting in undue distortion of the images, it is preferred to arrange the receiving ends of the optical fibers of each one of the subsystems into a geometric shape which may be easily and precisely attained.

The most elementary shape is the rectangular form (or small stick) which permits, by superimposition, the attainment of a scale where each gradation thereof is formed by a subsystem of a bundle of optical fibers coupled to a controlled light source.

As shown in FIG. 1, a rectangular shape permits the juxtaposition of several scales 10, 11, 12 and 13, in the object focal plane of the lens system, namely, a horizontal scale 10 and three vertical scales 11, 12 and 13. Each scale is in turn formed by a plurality of juxtaposed subsystem bundles, each of which forms one gradation of the scale and is formed of a plurality of joined optic fibers.

It is evident that where it is desired to produce a fixed symbol, the geometry or shape of this symbol is not important, and may be presented in many ways.

In general, in order to obtain a uniform, non-distorted image, it is preferred to align the optical fibers of each bundle, and to arrange them strictly parallel to each other at their emitting and receiving ends. Further, a maximum optical signal is obtained when the cross section of the reserving end of each of the fibers is normal to the incident light rays.

The light signal transmitted by each of the subsystems of bundles of optical fibers can be produced by a discrete controlled light source.

These light sources may consist, for example, as represented in FIG. 2, of micro-ampules 15 housed in recesses 16, adjacent to which are arranged at right angles the receiving ends of the optical fibers 17 of the corresponding subsystems.

In the embodiment of FIG. 1, the production of four movable index images for the four different scales is obtained by juxtaposition of the different arrangements of the optical fibers 14 in the image forming means.

In an alternative embodiment, this result could also be obtained by mixing several discrete images obtained from several image forming members.

This mixing might be carried out in a standard optical mixer of the type currently used, for example, in color televisions.

Figure 3:
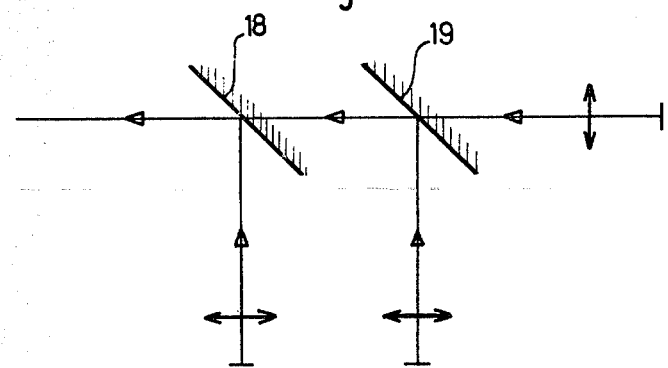
FIG. 3 is a schematic representation of an optical mixer utilizing a series of mixers and having two channels in series.

As illustrated in FIG. 3, mixing can also be obtained by an arrangement of a series of several mixers 18 and 19, each having two optical inputs.

Where it is desired where there is a superposition of object information, where for example the light sources and the corresponding arrangements can produce several sources of object information, the problem arises of control of the different light sources, and of multiplexing in the transmission of the control signals.

In this regard, each light source can be controlled by an addressing system wherein a binary number serves as an address for each light source. In an arrangement of this type a switching circuit provides for the activation of a lighting source when its corresponding address is received.

Where it is desired to produce a single movable index representative of a variable, the connection between the computer and the decoding means to control the light sources may be accomplished by a bundle (bus) having a number of connections equal to the number of bits (unit of binary information) used in the binary address number. The problem becomes much more complex if several object indices indicative of different variables must be produced and displayed simultaneously.

The present invention solves this problem simply by using the well known characteristic of retinal persistence. Instead of transmitting simultaneously the addresses to the several switching circuits effecting control of the several light sources, the invention transmits them in sequence successively at a frequency at which the flickering of the control lights is not discernable because of the retinal persistence of the pilot and the response times or inertia of the light sources.

Figure 4:
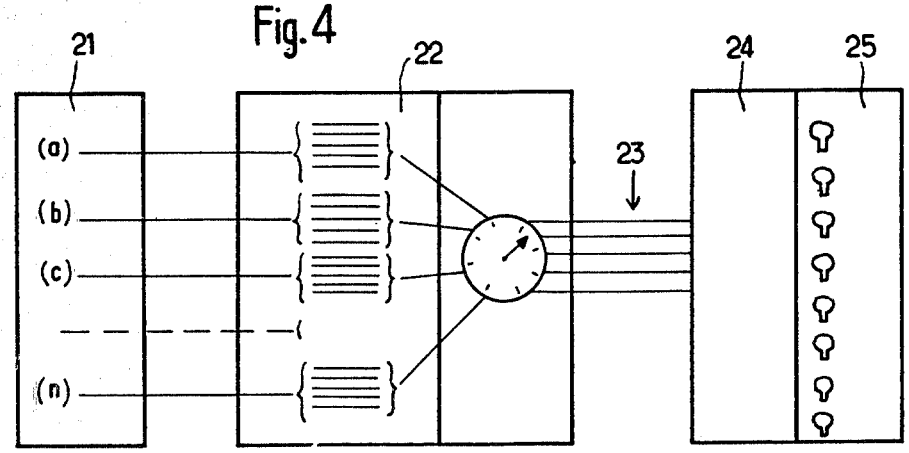
FIG. 4 is a block diagram of the control system of an image forming means which derives its data from a computer.

Referring to FIG. 4, the computer 21 transmits separately the numerical signals corresponding to several objects (a), (b), (c), (n), to a selector or multiplexer 22 which transmits these signals successively over a transmission line 23, having a limited number of conductors, to a decoder 24 which decodes the binary information and switches on the appropriate light sources 25 as indicated thereby.

It should be noted that the multiplex system described herein could be used, in an analogous manner, to control an image forming member consisting of an arrangement of liquid crystals functioning as electrical switches.

Figure 5:
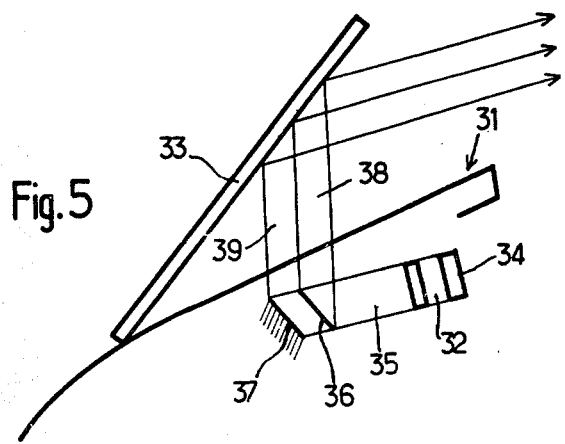
FIG. 5 is a partial longitudinal, schematic section of the front part of the cabin of an aircraft equipped with a display and indication system which includes a device for enlarging the size of the image projected on the windshield.

The display system shown in FIG. 5 is mounted in the shroud of an instrument panel 31 below the windshield of the aircraft. In this figure, only the lens 32 and the system enlarging the dimensions of the image projected on the windshield 33 have been shown. Lens system 32 has not been described in detail as it is a standard collimating lens design wherein a collimated beam of light forming an image at infinity is projected onto the windshield, as described in the parent patent application.

The collimated beam 35 is projected by this lens system onto two parallel mirrors 36, 37 placed in sequence. The first mirror 36 is a semireflecting mirror, and the second mirror 37 is a totally reflecting mirror 37, with the arrangement being such that the beam 35 is partially reflected from mirror 36 and then the portion of the beam transmitted through mirror 36 is totally reflected by mirror 37.

The positions of the two mirrors 36, 37 and their dimensions are selected to be entirely within the field of view of lens 32, and also the two successively reflected beams 38, 39 are adjacent to each other such that the two images are juxtaposed on the windshield 33 of the aircraft. As shown in FIG. 6, the system forms images 41 and 42, or 43 and 44 (the images 43 and 44 are shown to indicate the lateral displacement possible for the image in the field of the optical system). The rectangles 45 and 46 illustrate the projection field of the optical system formed by the lens 12 and the two respective mirrors 16 and 17.

It is evident that in order for there to be superposition of the two fields and of the images 41, 42, and 43, 44, it is necessary that one image be on the side of the other in the field, and also that there be correspondence between the upper edges 47 and the lower edges 48 of the images, so that there can be juxtaposition between the lower edges 48 of image 41 and the upper edges 47 of the image 42.

In order to attain uniformity of the images, it is preferable for semireflecting mirror 16 to transmit slightly more radiation than it reflects so that the intensity of both images be almost equal.

The number of partially reflecting mirrors and consequently the number of juxtaposed images, are not limited to two such that, for example, with the aid of a perceptibly exact image it is possible to obtain a linear image.

With reference to FIG. 7, the optical system 53 is positioned in the shroud of the instrument panel 51 below the windshield 52 of the aircraft. The optical system is comprised of standard lenses 54, 55, 56 which functioning alone would collimate the image formed by the member 57 to focus it at infinity. In addition, a cylindrical lens 58 is placed between the lenses 54, 55, 56 and the image forming member 57 to modify the projected light beam so that instead of obtaining at the output of the lenses 54, 55 and 56 a light beam with parallel rays, a slightly divergent beam 59 is obtained which is reflected from curved windshield 52 as a beam of parallel rays. The angle of each of these rays incident upon the optical axes of the lens is a function of the shape of the cylindrical lens 58, which compensates for the angular dispersions caused by the curvature of the windshield 52.

It is evident that a cylindrical lens 58 corrects only in some planes perpendicular to the axis of generation of the lens 58. It does not produce a correction taking into account the full shape of the profile of the windshield 52. Nevertheless, in many applications this absence of complete correction is not a serious handicap. For example, where the display and indication system serves the head-up flight control device, as when guiding the aircraft into the sun, the image projected onto the windshield forms a vertical bar which is displaceable horizontally. In this instance a correction taking into account the horizontal profile of the windshield 52 is imposed, and a correction taking into account the vertical profile of the windshield would serve no useful purpose.

In the systems previously described, at least the optical portion thereof is placed in the space remaining free behind the pilot's instrument panel which generally is very restricted. Because of obstructions, a light ray between the image forming system and the windshield of the vehicle follows a non-straight path induced, for example, by reflecting mirrors.

Nevertheless, it appears that these systems present a substantial disadvantage which consists of the pilot not being able, practically, to see all of the images projected onto the windshield that he is confronted with in the axis of the rays reflected by the windshield.

It has been established that this disadvantage was due principally to the length of the optical path between the plane of the lens element functioning as the diaphragm or iris and the windshield of the vehicle.

In order to reduce this path length in order to avoid the above-mentioned disadvantage, the invention reduces the use of reflectors, and proposes therefor an optical system such as the one illustrated in FIG. 9.

In this system the lens has been diagramed and represented as a converging lens $L_1$, the axis 62 of which, after reflection from the windshield 64, coincides with the axis 63 of the pilot's field of vision (shown as aperture O). This optical system functions in the same manner as a standard system of plain collimation.

The images of object 65 produced by the image forming system are collimated to focus at infinity, and can be seen by the pilot without his being forced to interrupt his external vision.

In this case, the field AB of the optical system is limited only by the dimensions of the lens $L_1$ which extended back virtually and perpendicular to the axis 63, acts as a diaphragm $L'_1$.

It appears now that if the pilot draws closer to the windshield (aperture O') his field of vision A'B' in the midst of the optical system is enlarged considerably.

Moreover, it appears from FIGS. 10 and 11 that if one looks at an object through a diaphragm L" the closer the aperture (eye) is to the object the larger is the angle (deviation Δ, Δ') through which one can observe the complete object through the diaphragm.

Consequently, as a practical matter because it is not possible to bring the pilot of the aircraft any closer to the windshield, it becomes expedient to bring the diaphragm L' closer to the pilot's eye. To this effect, the only solution is to bring the lens and the windshield as close as possible.

Consequently, as shown in FIG. 12, the invention arranges the lens 66 at the exit aperture of the objective lens system 67 in the plane of the upper face of the shroud of the instrument panel 68 of the pilot's cabin and on the edge of the lower limits of the normal forward field of vision of the pilot.

What is claimed is:

1. A system for displaying and indicating information on an aircraft windshield to the pilot of the aircraft, comprising:
   (a) converter means for transforming analog or numeric information signals to be supplied to the pilot into corresponding optical signals;
   (b) means for selecting at least one of said analog or numeric signals for display, whereby different analog or numeric signals are capable of being displayed;
   (c) projecting means for projecting the optical signals onto the windshield of the aircraft; and
   (d) transfer means for transmitting the optical signals from said converter means to said projecting means and including a plurality of bundles of optical fibers, wherein the optical fibers at the receiving and transmitting ends of the bundle of fibers are arranged parallel to each other, and the emitting ends of the optical fibers are formed into geometric shapes allowing juxtaposition, a discrete light source for each bundle, and addressing means for selectively controlling the lighting of each light source in accordance with address commands received by said addressing means.

2. A system as claimed in claim 1 and wherein said information comprises numerical signals generated by a computer, further comprising a selector means for receiving numerical signals generated by the computer, a transmission line having parallel conductors coupled to said selector means, and a decoder coupled to said transmission line for selecting the light sources to be illuminated.

3. A system as claimed in claim 1, comprising means, placed to intercept the image projected by said projection means, for enlarging the image projected by said projecting means and including at least two parallel mirrors, at least one of which is partially reflecting, said mirrors reflecting parallel reflected beams adjacent to each other and onto the windshield in juxtaposed positions.

4. A system as claimed in claim 3, said enlarging means comprising a totally reflecting mirror and a semi-reflecting mirror which is placed to transmit a beam of slightly greater intensity than it reflects, with the arrangement being such that the two beams incident on the windshield have approximately the same intensity.

5. A system as claimed in claim 1, wherein said windshield is curved, comprising correcting means, placed between an image forming means in said transfer means and said projection means, for compensating at least partially for the lack of parallelism in the rays of the beam reflected by the windshield of the aircraft and including a cylindrical lens.

6. A system as claimed in claim 1 wherein said selecting means includes a multiplexer means for cyclically switching between said different analog or numeric signals.

* * * * *